(12) United States Patent
Foltin

(10) Patent No.: US 10,510,255 B2
(45) Date of Patent: Dec. 17, 2019

(54) METHOD FOR REDUCING COLLISION DAMAGE

(71) Applicant: Robert Bosch GmbH, Stuttgart (DE)

(72) Inventor: Johannes Ludwig Foltin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 99 days.

(21) Appl. No.: 15/885,377

(22) Filed: Jan. 31, 2018

(65) Prior Publication Data

US 2018/0225971 A1 Aug. 9, 2018

(30) Foreign Application Priority Data

Feb. 8, 2017 (DE) .......................... 10 2017 201 936

(51) Int. Cl.
| | | |
|---|---|---|
| *G08G 1/16* | (2006.01) | |
| *B60T 7/22* | (2006.01) | |
| *B60N 2/00* | (2006.01) | |
| *B60Q 1/52* | (2006.01) | |
| *B60W 30/085* | (2012.01) | |
| *B60Q 5/00* | (2006.01) | |
| *B60Q 1/50* | (2006.01) | |

(52) U.S. Cl.
CPC .............. *G08G 1/166* (2013.01); *B60N 2/002* (2013.01); *B60Q 1/52* (2013.01); *B60T 7/22* (2013.01); *B60W 30/085* (2013.01); *B60Q 1/50* (2013.01); *B60Q 5/005* (2013.01); *B60T 2201/024* (2013.01)

(58) Field of Classification Search
None
See application file for complete search history.

(56) References Cited

U.S. PATENT DOCUMENTS

| | | | | |
|---|---|---|---|---|
| 6,327,536 B1 * | 12/2001 | Tsuji | ...................... | B60Q 9/008 |
| | | | | 340/435 |
| 6,677,853 B1 * | 1/2004 | Canfield | ............... | A01M 29/16 |
| | | | | 340/384.1 |
| 7,617,048 B2 * | 11/2009 | Simon | ................... | G01S 13/931 |
| | | | | 280/735 |
| 7,786,926 B2 * | 8/2010 | Hilsebecher | ........ | B60R 21/0134 |
| | | | | 342/104 |
| 8,082,101 B2 * | 12/2011 | Stein | ........................ | G08G 1/16 |
| | | | | 701/301 |

(Continued)

FOREIGN PATENT DOCUMENTS

| | | |
|---|---|---|
| DE | 102008005310 A1 | 7/2009 |
| EP | 2743145 A1 | 6/2014 |

*Primary Examiner* — Jonathan M Dager
(74) *Attorney, Agent, or Firm* — Norton Rose Fulbright US LLP; Gerard Messina

(57) ABSTRACT

A method for performing an evasive maneuver of a motor vehicle in the event of an imminent collision with at least one collision object comprising at least the following: a) detecting that a collision with the at least one collision object is imminent, b) analyzing the at least one collision object and detecting whether a particularly sensitive upper region of the motor vehicle would be at least partially affected by the collision, and c) outputting a signal for initiating an evasive maneuver if a collision of the motor vehicle with the at least one collision object is imminent by which the particularly sensitive upper region of the motor vehicle would be at least partially affected.

15 Claims, 2 Drawing Sheets

(56) References Cited

U.S. PATENT DOCUMENTS

| | | | | |
|---|---|---|---|---|
| 8,577,550 B2* | 11/2013 | Lu | B60W 10/06 | 340/435 |
| 8,762,044 B2* | 6/2014 | Kelly | G06F 7/00 | 434/305 |
| 8,930,105 B2* | 1/2015 | Cetinkaya | B60T 7/22 | 180/274 |
| 9,043,077 B2* | 5/2015 | Doerr | B60R 21/0132 | 701/32.2 |
| 9,381,915 B1* | 7/2016 | Crombez | B60W 30/08 | |
| 9,440,649 B2* | 9/2016 | Ciotlos | B60W 30/085 | |
| 9,701,239 B2* | 7/2017 | Kentley | B60N 2/002 | |
| 9,701,307 B1* | 7/2017 | Newman | B60W 50/16 | |
| 9,725,058 B2* | 8/2017 | Kaerner | B60R 21/0132 | |
| 9,988,011 B2* | 6/2018 | Battermann | B60R 21/38 | |
| 10,235,886 B1* | 3/2019 | Baughman | G08G 1/166 | |
| 10,315,649 B2* | 6/2019 | Kadetotad | B60W 30/08 | |
| 2002/0183929 A1* | 12/2002 | Tsuji | G01S 11/12 | 701/301 |
| 2003/0139881 A1* | 7/2003 | Miller | B60R 21/013 | 701/301 |
| 2006/0250297 A1* | 11/2006 | Prakah-Asante | B60R 21/0134 | 342/70 |
| 2007/0018800 A1* | 1/2007 | Boss | B60Q 9/008 | 340/435 |
| 2007/0112514 A1* | 5/2007 | Ekmark | G08G 1/161 | 701/301 |
| 2008/0046148 A1* | 2/2008 | Hayashi | B60R 21/0132 | 701/45 |
| 2008/0084283 A1* | 4/2008 | Kalik | B60Q 9/00 | 340/435 |
| 2008/0130954 A1* | 6/2008 | Taniguchi | G06K 9/00369 | 382/104 |
| 2009/0171536 A1* | 7/2009 | Zimmer | B60R 21/0134 | 701/49 |
| 2009/0192683 A1* | 7/2009 | Kondou | B60W 10/18 | 701/53 |
| 2010/0263957 A1* | 10/2010 | Shaw | B60R 21/38 | 180/281 |
| 2011/0015818 A1* | 1/2011 | Breuer | B60T 8/17558 | 701/31.4 |
| 2011/0254330 A1* | 10/2011 | Lich | B60N 2/0276 | 297/216.1 |
| 2012/0078499 A1* | 3/2012 | Park | B60R 21/0136 | 701/301 |
| 2012/0083960 A1* | 4/2012 | Zhu | G05D 1/0214 | 701/23 |
| 2012/0130629 A1* | 5/2012 | Kim | B60W 30/085 | 701/301 |
| 2012/0212353 A1* | 8/2012 | Fung | B60K 28/06 | 340/905 |
| 2012/0245491 A1* | 9/2012 | Amell | A61B 5/6893 | 600/595 |
| 2012/0265401 A1* | 10/2012 | Stuetzler | B60W 40/12 | 701/38 |
| 2012/0296526 A1* | 11/2012 | Freienstein | B60R 19/26 | 701/45 |
| 2013/0261869 A1* | 10/2013 | Brenneis | B60W 50/0205 | 701/23 |
| 2013/0282268 A1* | 10/2013 | Goerick | B60W 30/095 | 701/301 |
| 2014/0009307 A1* | 1/2014 | Bowers | G08G 1/161 | 340/901 |
| 2014/0012492 A1* | 1/2014 | Bowers | G08G 1/16 | 701/301 |
| 2014/0032049 A1* | 1/2014 | Moshchuk | B62D 15/0265 | 701/42 |
| 2014/0074359 A1* | 3/2014 | Lane | B60Q 1/525 | 701/45 |
| 2014/0285667 A1* | 9/2014 | Aimura | G08G 1/166 | 348/148 |
| 2014/0330484 A1* | 11/2014 | Freienstein | B60R 21/015 | 701/45 |
| 2014/0336880 A1* | 11/2014 | Freienstein | B60R 21/0132 | 701/45 |
| 2014/0340239 A1* | 11/2014 | Wyble | G08G 1/096783 | 340/905 |
| 2014/0379167 A1* | 12/2014 | Flehmig | B60W 50/0097 | 701/1 |
| 2015/0032372 A1* | 1/2015 | Fuehrer | G08G 1/205 | 701/515 |
| 2015/0123816 A1* | 5/2015 | Breed | G08G 1/162 | 340/905 |
| 2015/0170519 A1* | 6/2015 | Langgood | G08G 1/164 | 701/117 |
| 2015/0175159 A1* | 6/2015 | Gussner | B62D 15/0265 | 701/1 |
| 2015/0202939 A1* | 7/2015 | Stettner | B60R 21/0134 | 701/37 |
| 2015/0321668 A1* | 11/2015 | Elwart | B60T 8/17557 | 701/41 |
| 2016/0121884 A1 | 5/2016 | Ciotlos et al. | | |
| 2016/0355181 A1* | 12/2016 | Morales Teraoka | B60W 30/14 | |
| 2017/0096117 A1* | 4/2017 | Joga | B60R 21/0136 | |
| 2017/0120803 A1* | 5/2017 | Kentley | B60Q 1/26 | |
| 2017/0120904 A1* | 5/2017 | Kentley | G01C 21/32 | |
| 2017/0137023 A1* | 5/2017 | Anderson | B60G 17/0195 | |
| 2017/0154241 A1* | 6/2017 | Shambik | B60R 1/00 | |
| 2017/0251659 A1* | 9/2017 | Pereca | A01M 29/16 | |
| 2017/0297568 A1* | 10/2017 | Kentley | G06F 3/1454 | |
| 2018/0093632 A1* | 4/2018 | Nagasawa | B60R 21/0136 | |
| 2018/0126983 A1* | 5/2018 | Beauvais | B60W 10/04 | |
| 2018/0178745 A1* | 6/2018 | Foltin | B60R 21/0134 | |
| 2018/0222426 A1* | 8/2018 | Foltin | B60R 21/0134 | |
| 2018/0284789 A1* | 10/2018 | Oguro | G05D 1/0214 | |
| 2019/0086550 A1* | 3/2019 | Dussan | G01S 7/4814 | |
| 2019/0100177 A1* | 4/2019 | Schulz | B60R 21/01512 | |
| 2019/0196021 A1* | 6/2019 | Stettner | B60R 21/0134 | |

* cited by examiner

METHOD FOR REDUCING COLLISION DAMAGE

CROSS REFERENCE

The present application claims the benefit under 35 U.S.C. § 119 of German Patent Application No. DE 102017201936.0 filed on Feb. 8, 2017, which is expressly incorporated herein by reference in its entirety.

BACKGROUND INFORMATION

The present invention relates to a method for reducing collision damage in particular in a collision of a motor vehicle with a collision object. In such a collision, a reduction of the collision damage on the motor vehicle is able to reduce in particular the risk of injury of occupants of the motor vehicle.

Modern motor vehicles are equipped with extensive sensors and monitoring devices with the aim of increasing the safety for the vehicle occupants and external road users. Also in the course of the development of autonomous vehicles, which take part in road traffic without intervention of a driver, constantly improved systems for scanning the surroundings of the vehicle were and are being developed.

Such systems have been used for the purpose of predicting possible collisions as early as possible, to estimate their course and severity and in the event of an accident to trigger in time active safety systems of the vehicle such as belt tighteners, seat adjustments and/or airbags.

Conventional methods are available according to which motor vehicles are able to avoid collisions with objects in automated fashion. Conventional methods, however, are often expensive to implement. Moreover, in many situations, the conventional methods avoid collision damage only insufficiently.

SUMMARY

The present invention provides a particularly advantageous method for reducing collision damage. Advantageous developments of the method are described herein.

The method is preferably in particular intended and designed to avoid a collision with the collision object entirely or at least to reduce the damage to be expected by the collision, in particular for occupants of the motor vehicle. The collision object may be in particular a moving object. The method is preferable in particular intended and designed to detect an imminent collision with an animal and to avoid or at least reduce collision damage to be expected in the process. The animal may be in particular a large animal such as a moose, a horse or a cow.

The indicated method steps a) through c) are preferably run through in the indicated order.

In step a), it is preferably detected that a collision of the motor vehicle with a collision object is imminent. For this purpose, possible collision objects in the surroundings of the motor vehicle are detected in such a way that each possible collision object (in particular if it is a moving object) is assigned an expected (future) trajectory. For this purpose, preferably a current position, a current (absolute or relative) speed and/or a current (absolute or relative) direction of movement of the possible collision object are ascertained. In this context, a relative speed and a relative direction of movement are understood as a speed and a direction of movement relative to the motor vehicle itself. In this context, an absolute speed and an absolute direction of movement are understood as a direction of movement in a static frame of reference, in which the motor vehicle is moving as well. It is also possible to ascertain and take into account time derivatives of the movement (such as, e.g., an acceleration). To determine the expected trajectory, it is possible to assume for example that the possible collision object will continue to move at a constant speed in a constant direction. Such an assumption may be expedient particularly because the described method is able to intervene in particular during a reaction time of a driver of the motor vehicle. Within an corresponding time span of for example one second, it may be assumed that the possible collision object does not change its speed and/or its direction of movement or changes these only slightly. Alternatively, it is possible to take into account a possible change of the speed and/or the moving direction of the possible collision object. For this purpose, it is possible for example to determine a (spatial) region, within which the actual trajectory will be located with great probability. Furthermore, it is possible to assume, for example, that the speed of the possible collision object changes starting from a known current value and will with great probability be within a specific range. It may be assumed for this purpose that the range will increase with an increasing interval from the current point in time. This means that a prediction of the speed is assumed to be more imprecise the more distant is the considered point in time. A relative speed and a relative direction of movement of a collision object may also be ascertained from the absolute speed and the absolute direction of movement of the collision object and of the speed and of the direction of movement of the motor vehicle.

Furthermore, if applicable, an expected (future) trajectory of the motor vehicle is determined. For this purpose, it is in particular possible to use information that is determinable via sensors of the motor vehicle. This information may be for example a previous characteristic curve of the speed, a current speed, a previous characteristic curve of the direction of movement, a current direction of movement, an operating state (e.g., an engine speed or a currently engaged gear of a transmission) and/or a mass (in particular including a payload) of the motor vehicle and/or a state of the roadway (in particular concerning slipperiness, wetness, grip and/or slope). The sensors existing in the motor vehicle are able to determine the expected trajectory of the motor vehicle particularly well and in particular more precisely than the expected trajectory of a possible collision object. Additionally or alternatively, the trajectory of the motor vehicle may be a previously planned trajectory, which was planned for the motor vehicle to travel. Such a planned trajectory exists regularly in vehicles that are operated in an automated driving mode. The expected trajectory is preferably first determined without taking into account a possible intervention by the method described here (i.e. in particular without an evasive maneuver). For the motor vehicle as well, it may be assumed for example that it will continue to move at a constant speed in a constant direction. It is also is possible to take into account a possible change of the speed and/or the direction of movement of the motor vehicle as for the possible collision object.

Preferably, the expected trajectory of the motor vehicle is compared to the expected trajectories of all detected possible collision objects (at least implicitly). An at least partial intersection of the expected trajectory of the motor vehicle with an expected trajectory of a possible collision object indicates an imminent collision. In the event of an uncertainty regarding a possible collision, a probability of a collision is possibly additionally determined. If this probability is above a defined minimum value, it is preferably assumed that a collision is imminent.

In step b), the at least one collision object is preferably analyzed in such a way that it is possible to detect whether the particularly sensitive upper region of the motor vehicle will be affected by the imminent collision. In particular in a collision with a large animal as collision object, occupants of the motor vehicle may be injured. This may be the case in particular when legs of the animal are so long that the torso of the animal (particularly prior to the collision) is at a height of a windshield of the motor vehicle. This may be so for example in the case of a moose, a horse or a cow. In that case, the animal (and in particular its torso) may strike the windshield of the motor vehicle nearly without being decelerated. In particular the windshield as well as the vehicle occupants situated directly behind the windshield and protected only by the windshield are preferably part of the particularly sensitive upper region of the motor vehicle, which is particularly endangered in such a collision with a large animal and which may be especially protected by the described method. The particularly sensitive region of the motor vehicle also comprises preferably A-pillars (i.e. body structures of the motor vehicle that bear a roof of the motor vehicle in the area of the windshield). In the particularly sensitive upper region of the motor vehicle, there may frequently be heads of vehicle occupants for example, which may be injured for example when the windshield is smashed.

In a motor vehicle that has an (essentially) horizontal engine hood, the torso of the animal may move across the engine hood and strike the windshield nearly without being decelerated. In such a motor vehicle, the particularly sensitive upper region therefore comprises preferably at least the region above the engine hood.

In order to protect in particular the especially sensitive upper region of the motor vehicle, preferably an analysis is performed in step b) in particular as to how large the collision object is and/or at what height a mass center of the collision object is located. On this basis, preferably an analysis is made as to whether and to what extent the particularly sensitive region of the motor vehicle may be affected by the collision. A corresponding analysis may be performed in a control unit of a motor vehicle.

Fundamentally, a reaction to an imminent (in particular unavoidable) collision may be an emergency braking action and/or an evasive maneuver. An emergency braking action is preferably initiated immediately following the detection of the imminent collision. The speed of the motor vehicle may thereby be reduced and possible damage mitigated. If additionally an evasive maneuver is performed, then this may reduce the achievable deceleration by the emergency braking action. This may be due in particular to the fact that a steerability of the motor vehicle is maintained (in particular by an electronic braking system) in spite of the emergency braking action. An emergency braking action may also be omitted if the vehicle occupants may be effectively protected by an evasive maneuver and if the emergency braking action would reduce the possibility of initiating an evasive maneuver. In particular, for physical reasons, the maximum acceleration, represented in simplified fashion as the sum of the lateral acceleration (steering) and the longitudinal acceleration (braking), is limited, as a result of which the possibility of performing an emergency braking action and the possibility of performing an evasive maneuver mutually limit each other. A limit of the maximum acceleration lies for example in the range of gravitational acceleration. An evasive maneuver may also endanger other road users and/or cause a collision with another collision object. By considering the mentioned arguments, a decision is preferably reached as to whether or not the evasive maneuver according to step c) is performed. If the evasive maneuver is to be initiated, a corresponding (trigger) signal is output in step c), which is received by components for performing the evasive maneuver. The signal may for example also contain information about how or in what manner the evasive maneuver is to be performed. This means that according to step c) an evasive maneuver is preferably (only) initiated if a collision of the motor vehicle with the at least one collision object is imminent, by which the particularly sensitive upper region of the motor vehicle would be affected at least partially.

If it is detected instep b) that a collision is imminent with a small collision object, by which the particularly sensitive upper region of the motor vehicle is not affected or affected only very little, then preferably only an emergency braking action is performed and no evasive maneuver according to step c). In this case, the advantages of the pure emergency braking action predominate in particular because there is no special endangerment of the occupants of the motor vehicle to be feared for example in that the collision object breaks through the windshield.

If it is detected in step b) that a collision with a large collision object is imminent, by which the particularly sensitive upper region of the motor vehicle would be affected, then preferably a further differentiation is made regarding an expected impact speed. The impact speed is the speed at which the motor vehicle, as expected, would strike the collision object, that is, the relative speed between the motor vehicle and the collision object at the time of the collision. If the expected impact speed is low (in particular lower than a defined limit value), then preferably only an emergency braking action and no evasive maneuver according to step c) is performed. In this case as well, the advantages of the pure emergency braking action predominate because due to the low impact speed no particular endangerment of the occupants is expected. However, if the expected impact speed is high (in particular higher than the defined limit value), then preferably an emergency braking action and additionally an evasive maneuver according to step c) are performed. In this case, the advantages of the evasive maneuver predominate in particular because without it, it is to be expected for example that the collision object will break through the windshield.

If the evasive maneuver is performed according to step c), then preferably in the process in particular the expected trajectories of all possible collision objects detected in step a) are taken into account. This makes it possible to prevent the evasion of one collision object from resulting in a collision with another collision object. Preferably, a plurality of possible evasion trajectories is determined for the motor vehicle. For this purpose, an ascertainment is preferably made, on the basis of the expected trajectory of the motor vehicle described further above, as to what influence a possible intervention by the described method could have. For this purpose, preferably information is used that is ascertainable by the sensors of the motor vehicle and from which the expected trajectory of the motor vehicle may be determined.

From the plurality of possible evasion trajectories, the one is preferably selected, along which no collision with a collision object is to be expected. If no such evasion trajectory exists, the one is preferably selected, along which an overlap of the collision object and the motor vehicle is as small as possible. It is also possible to weight different regions of the motor vehicle differently so that the evasion trajectory is selected, along which regions of the motor vehicle that are particularly worthy of protection are especially protected. It is preferred that the particularly sensitive upper region of the motor vehicle is weighted particularly highly. If a plurality of possible trajectories yield the same results, then preferably of the respective possible trajectories the one is selected that requires the least intervention (i.e. the least deviation from the expected trajectory).

The intervention by the described method according to step c) preferably occurs via an intervention device that is able to intervene in the steering of the motor vehicle. For example, an electric motor is able to engage in a steering column via a toothed wheel. The intervention device is preferably controlled via a control unit using appropriate software.

In one specific embodiment of the method, the driver is able to end or at any rate reduce the intervention by the described method, which may be expedient in driver assistance systems, for example. In such systems, an override is usually possible. If necessary, a driver is also able to override the interventions into the operation of the motor vehicle occurring in the context of the method described here. This maybe expedient for example so that the driver is able to perform a human valuation. If for example a collision with two collision objects is not avoidable, then the described method preferably evades in such a way that overall the least injury is to be expected for the occupants of the motor vehicle. If one of the collision objects, however, is a human being and the other an object for example, then in human valuation an evasion trajectory is preferred, in which the motor vehicle does not collide with the human being. The intervention by the described method may be terminated or reduced for example in that the driver steers counter to the intervention by the described method, that is, in that the driver counteracts the evasive maneuver. This kind of countersteering may be detected for example via a sensor, whereby the intervention may be terminated or in any case modified. The intervention device may also be designed in such a way that the driver is able to prevent an intervention by holding the steering wheel.

In a particularly preferred specific embodiment, the maximum intensity of the intervention into the operation of the motor vehicle occurring in the context of the described method is limited to such an extent that the driver is able to override the intervention. This makes it possible to install weak intervention actuator technology. The term "weak" in this context means that the driver is able to perform stronger interventions via the operating interface of the motor vehicle (in particular the steering wheel). In addition, it may be possible partially to dispense with expensive sensor technology for detecting the intervention because the driver is still able to correct the intervention, if necessary.

In a particularly driver-oriented specific embodiment, the driver is merely given an indication for an evasion direction, for example in the form of a slight and/or brief steering impulse. The driver is thereby able to take up the steering impulse and to incorporate it into his action for example as a recommendation.

There may also be a provision for the driver to be able to switch off the method (at least for a certain duration). This may be practical, for example, if the motor vehicle is operated (at least temporarily) in a location where statutory regulations do not permit the use of the described system.

In a preferred specific embodiment of the method, in step a) the surroundings of the motor vehicle are monitored for possible collision objects at least using a surround sensor of the motor vehicle.

The surroundings of the motor vehicle are preferably monitored at least for the duration of an operation of the motor vehicle. The surround sensor preferably comprises an exterior camera and/or an infrared sensor. Using the surround sensor, preferably a range within a radius of 200 m, at least, however, of 30 m [meters] around the motor vehicle is monitored. It is preferred that of such a radius around the motor vehicle an angular segment of at least 90°, at least, however, 40° is monitored, which is in front of the motor vehicle in the direction of travel of the motor vehicle. The surround sensor is preferably connected to a control unit of the motor vehicle. From signals of the surround sensor, the control unit is able to ascertain, preferably by software, whether possible collision objects are located in the (monitored) surroundings of the motor vehicle.

In another preferred specific embodiment of the method, the evasive maneuver according to step c) is performed in such a way that a preferably small portion of the motor vehicle will be affected by a collision.

After an analysis was made in step b) as to which regions of the motor vehicle would be particularly affected by the collision (without intervention through the described method), the evasive maneuver according to step c) is preferably performed in such a way that the damage to the motor vehicle and in particular injury of the occupants is as light as possible. Injury of the occupants of the motor vehicle may be particularly light especially if only a small portion of the motor vehicle will be affected by (i.e., damaged by) the collision. Damage may also be particularly light if the at least one collision object and the motor vehicle overlap in only a particularly minor way. A contributing factor in this respect may be that, in the case of a merely partial overlap, following the collision, the motor vehicle and the collision object are able to move past each other, without the speeds of the collision object and of the motor vehicle adapting to each other completely. It is possible that a collision of this kind causes considerably less damage than a collision in which the collision object overlaps entirely with the motor vehicle.

In another preferred specific embodiment of the method, the evasive maneuver according to step c) is performed in such away that a driver of the motor vehicle is protected in the best way possible.

It is especially worthwhile to protect the driver of a motor vehicle because the driver is able to control the motor vehicle and thus avoid (further) damage. A method according to this specific embodiment is able to contribute toward the driver being able to continue to steer and control the motor vehicle (at least in a limited way) following the collision. This makes it possible to prevent the motor vehicle, following the collision, from straying from the road in uncontrolled fashion or getting into oncoming traffic. In particular, the driver area of the motor vehicle is also especially worth protecting, since in any event at least in this area a human being is present while the motor vehicle is in operation. All other seats of the motor vehicle are possibly unoccupied. Furthermore, an increased protection of the driver compared to occupants on the rear bench is sensible because occupants on the rear bench (rear area of the motor vehicle) are normally better (passively) protected already by the fact of there being a longer path of a collision object to the rear bench than to the driver seat (front part of the motor vehicle).

In another preferred specific embodiment of the method, a check is performed prior to step c) to determine which seats of the motor vehicle are occupied, the evasive maneuver according to step c) being adapted as a function of the seat occupancy.

If it is known which seats of the motor vehicle are occupied, this is preferably also taken into account in the choice of the evasion trajectory. For example, if only the driver's seat in front on the left and the rear seat on the right are occupied, then it is possible to select an evasion trajectory that results in damage to the motor vehicle in front on the right (and not in front on the left). The occupant on the back seat is better protected than the driver because of the greater distance from the windshield. The probability that the collision object enters all the way into the rear area is normally lower than the probability of an entry of the collision object into the front area.

In a particularly advantageous specific embodiment, the type of seat occupancy is evaluated. For example, an evasion trajectory may be selected in such a way that a seat occupied by a human being is not damaged or damaged only a little, while a seat occupied by a (domestic) animal or an object is damaged more severely. This takes into account the fact that a human life may be regarded as being more valuable than the life of an animal or the integrity of an object.

In a particularly advantageous specific embodiment, the evasion trajectory is adapted on the basis of the (in particular passive) protection options. Thus, for example, it is possible to avert the damage on a side where there is an unprotected person if on the other side there exist at least local protection options, which are able to prevent or mitigate the entry of the collision object at least locally. Examples for such protection options are for example roll bars, bucket seats in particular having a high backrest and/or lateral supports, baby carriers, child seats and/or at least partially closed seat capsules. These protection options have in particular in common that they offer a particularly good possibility of deflecting the force from the entering object to the motor vehicle and/or have a support effect vis-a-vis collision objects that enter in particular obtusely. Entering collision objects may also include the vehicle roof if a collision object indents the windshield and/or the vehicle roof due to a high mass or a high crash impulse and if the vehicle roof is pressed into the interior. The occupants may be severely injured by the entry of the roof, even if the collision object itself, which was detected for example by the surround sensor, does not enter directly into the interior. Safety devices, which are able to prevent or reduce the (temporary) indentation of the roof for an occupant, may reduce or prevent the risk of injury of the occupant. Accordingly, an evasion trajectory may be selected in such a way that the existence of the at least local protection option is taken into account in order to minimize for example the maximum injury severity for all occupants.

The check, as to which seats of the motor vehicle are occupied, may be performed for example via weight sensors in the seats (a seat counting as occupied if a defined minimum mass is measured on it), via optical sensors and/or by entry into a board computer.

In another preferred specific embodiment of the method, prior to step c), sitting positions of occupants of the motor vehicle are analyzed, the evasion maneuver according to step c) being adapted as a function of the sitting positions of the occupants.

The sitting position and in particular the position of the head of an occupant may influence how severely the latter is injured in a collision with a collision object. This applies in particular to collisions with large animals that may break through the windshield. An occupant, who is leaning forward and holds his head near the windshield, is particularly at risk. An occupant, however, who holds his head at the headrest, is less at risk. In particular, an occupant maybe protected by the fact that he holds his head as low as possible (in particular below the windshield), for example if he is in a reclined position.

In another specific embodiment, buckled-up persons are being particularly protected, since persons who are not buckled up are able to change the sitting position more quickly in order in this manner, for example, to remove themselves from the area of risk by ducking down when a collision object enters.

The sitting position of an occupant may be detected, for example, by one or multiple interior cameras directed into a passenger compartment of the motor vehicle. A control unit including a software is able to analyze signals of the interior camera (s) recorded in this manner. It is also possible to detect via light barriers, for example, whether an object (which may be in particular a head of an occupant) is located in the particularly sensitive upper region of the motor vehicle.

It is also possible to analyze via the interior camera(s) whether a seat is occupied.

This occurs preferably in addition to information that is obtained via weight sensors in the seats. If for example the minimum mass is exceeded on a seat, then it is possible to check via an interior camera whether a person or merely a heavy object is located on this seat.

If it is detected that an occupant is sitting on a seat in a particularly protected position, then preferably an evasion trajectory is selected, in which other occupants sitting in a less protected position are protected more. A reclined position, in which the head is below the engine hood, may be assumed to be a particularly protected position.

In another preferred specific embodiment of the method, prior to step c), a movement of the collision object is evaluated, the evasive maneuver according to step c) being performed in such a way that preferably only a rear area of the collision object (seen in the moving direction of the collision object) will be affected by the collision.

In this specific embodiment, an evasion trajectory is preferably selected, in which only the rear part of the collision object (seen in the moving direction of the collision object) will be affected by the collision. This may be advantageous because an animal will speed up rather than slow down when it recognizes a danger and wants to flee. If the animal accelerates, then in an evasion trajectory according to this specific embodiment, damage may be less than expected.

In another specific embodiment, prior to and/or while following the evasion trajectory, an attempt is made to alert the animal to the imminent danger, and thus for example to adapts its movement, by acoustic signals such as honking and/or by light signals such as briefly turning up the headlights. For example, an animal may be prompted by honking to move more quickly and thus to reduce damage further for example when evading in the direction of the rear part of the animal.

Light signals and/or sound signals are possibly emitted only if it was analyzed previously that there is actually sufficient probability of thereby reducing the severity of the accident. The trajectory of a collision object recognized as an animal may possibly be influenced by light signals and/or sound signals.

In another specific embodiment, the species of animal is classified and an estimate is made as to whether the animal prefers to slow down or may even stand still, or whether the animal prefers to speed up, rather than slow down. This may depend on the species of animal, for example whether it is a flight animal and/or whether there are natural enemies that may trigger a flight reflex. If it is an animal that prefers to stand still, then this may be taken into account when choosing the evasion trajectory.

In another preferred specific embodiment of the method, an analysis is made in step b) whether the collision object has the shape of an animal.

If the collision object is another motor vehicle for example, then its speed and/or direction of movement may be regarded with great probability as unchanged, at least for the duration of human reaction time. Animals, on the other hand, often move irregularly even outside of a dangerous situation. For this reason, when determining an expected trajectory of an animal, a greater uncertainty is assumed for its expected speed and or moving direction. It is furthermore preferably detected in which position a head of the animal is located. From this fact, it is possible for example to determine a moving direction of the animal. This may be advantageous in particular if the animal was hitherto standing still for example and/or if it is not possible to detect a clear moving direction. In such a case, it may be assumed in particular that the animal will move in the direction of its head.

The ascertainment whether the collision object is an animal or not is preferably made via a control unit equipped with software from data of the surround sensor (in particular the exterior camera). It is possible, for example, to evaluate a movement behavior and or a shape of the collision object. It is also possible to analyze where the mass center of the collision object lies. For this purpose, it is possible for example to determine from the shape of the collision object a center of area or center of volume, and it may be assumed that the latter coincides at least approximately with the mass center. In particular, collision objects that have a particularly high mass center may be animals (having long legs).

Collision objects having a particularly high mass center may also be cargo trucks for example, it being possible to assume for example the cargo sill as the mass center. If it is above the engine hood, in the event of an impact, the cargo sill may, for reasons of geometry, extend far beyond the engine hood and thus injure the occupants severely. For this reason, a cargo truck may be treated similarly as an animal having a high mass center.

In separable collision objects such as for example in the collision with motorcycles (in which rider and motorcycle may be separated from each other in the collision), it is possible to consider the driver as separate from the motorcycle for example when considering the mass center. The motorcycle frequently has a higher mass than the motorcycle rider, as a result of which the mass center of the combined collision object of driver and motorcycle is low. In a collision, however, the driver may separate from the motor cycle and slide across the engine hood since the mass center of the motorcycle rider alone is usually above the mass center of the motor cycle.

In another preferred specific embodiment of the method, the evasive maneuver according to step c) is performed at least in the case in which the collision object analyzed in step b), for example an animal, exceeds a minimum size.

The evasive maneuver according to step c) is preferably performed if the particularly sensitive upper region of the motor vehicle will be at least partially affected by the collision. If the collision object does not exceed the minimum size, it is preferably assumed that the particularly sensitive upper region of the motor vehicle will not be affected by the collision. In this case, preferably no evasive maneuver is performed. If the collision object is recognized as an animal that exceeds the minimum size, then it is preferably assumed that the particularly sensitive upper region of the motor vehicle may be at least partially affected by the collision. In this case, an evasive maneuver is preferably performed.

Additionally or as an alternative to the minimum size, an ascertained body center (mass center and/or volume center) may be used, and [if it] lies [above] a minimum height (for example higher than a height of an engine hood), the evasive maneuver is initiated. If the body center lies above the minimum height, then the probability increases that a sensitive area is struck. If the body center is below the minimum height, then it may be assumed in particular that the collision object is pushed in front of the vehicle and does not slide over the engine hood.

In addition to the control unit already introduced above, a computer program and a machine-readable storage medium, on which this computer program is stored, are to be described here as well.

Additional details of the present invention and an exemplary embodiment, to which the present invention is not limited however, are explained in more detail based on the figures.

DETAILED DESCRIPTION OF EXAMPLE EMBODIMENTS

Figure 1:
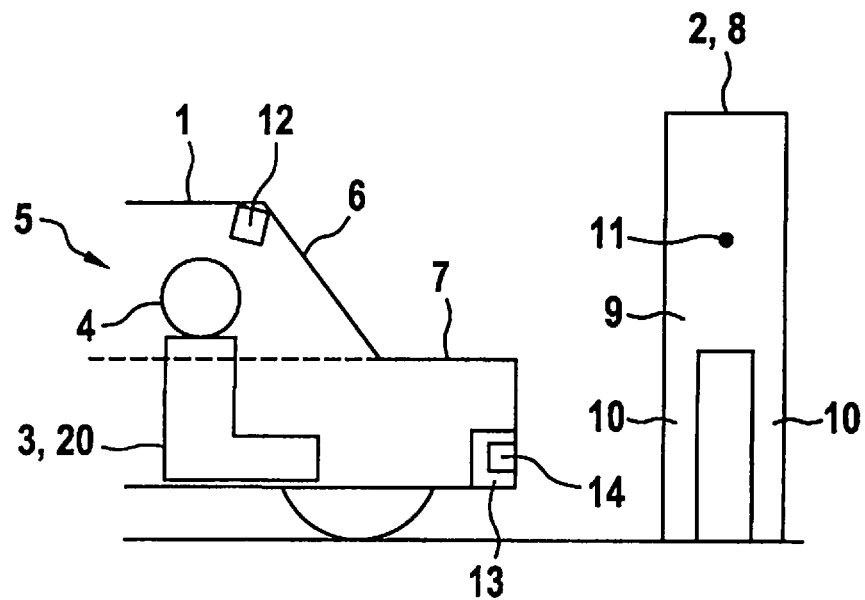
FIG. 1 shows a schematic cross-sectional view of a motor vehicle and a collision object.

FIG. 1 is a schematic representation of a motor vehicle 1 and of a collision object 2. Located within motor vehicle 1 are occupants 20, of which only a driver 3 is shown by way of example. The figure shows in particular a head 4 of driver 3. The head of driver 3 is situated in a particularly sensitive upper region 5 of motor vehicle 1. A dashed line indicates how far the particularly sensitive upper region 5 extends downward. In the event of a collision of motor vehicle 1 with collision object 2, the particularly sensitive upper region 5 of motor vehicle 1 may be damaged particularly severely. This may be the case in particular because the collision object 2 is an animal 8, which has a mass center 11 above an engine hood 7 of the motor vehicle 1 in particular due to comparably long legs 10. In the event of a collision, a torso 9 of animal 8 may move across engine hood 7 of motor vehicle 1 and strike (in particular nearly without being slowed down) a windshield 6 of motor vehicle 1. In order to keep damage to the particularly sensitive upper region 5 of motor vehicle 1 as low as possible and to protect occupants 20 particularly well, the described method is performed for motor vehicle 1. For this purpose, motor vehicle 1 has a surround sensor 13, which comprises an exterior camera 14. This may be used to detect and analyze collision object 2. Motor vehicle 1 furthermore has an interior camera 12, which may be used to analyze a sitting position of driver 3.

Figure 2:
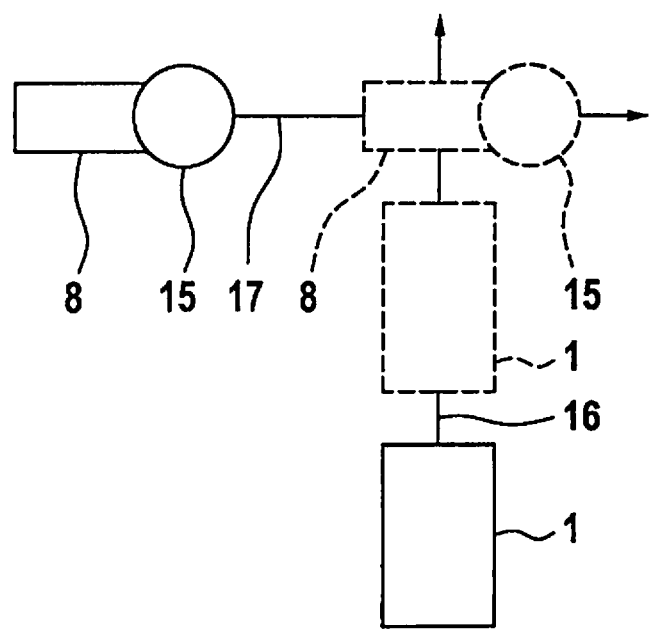
FIG. 2 shows a schematic representation of the expected trajectories of the motor vehicle and of the collision object without evasive maneuver.

FIG. 2 shows a schematic representation of an expected trajectory 16 of motor vehicle 1 and an expected trajectory 17 of the collision object. The collision object is in this case an animal 8 including a head 15 and a rear area 21 (seen in the moving direction of animal 8). Motor vehicle 1 and the collision object or animal 8 are each shown in two positions. Solid lines show where motor vehicle 1 and the collision object are located at a start time. The start time is the point in time at which the collision object 2 is detected. Dashed lines indicate where motor vehicle 1 and collision object 2 are located at the time of the collision. The surroundings of motor vehicle 1 are monitored for possible collision objects, as a result of which an imminent collision with collision object 2 is detected. Collision object 2 is furthermore preferably analyzed in order to detect whether the particularly sensitive upper region 5 of motor vehicle 1, which is shown in FIG. 1, will be affected at least partially by the collision. If this is the case, an evasive maneuver will be performed.

The example in FIG. 2 shows the case in which no evasive maneuver is performed. The figure shows that as a result motor vehicle 1 and animal 8, which is a collision object in this case, overlap completely in a collision.

Figure 3:
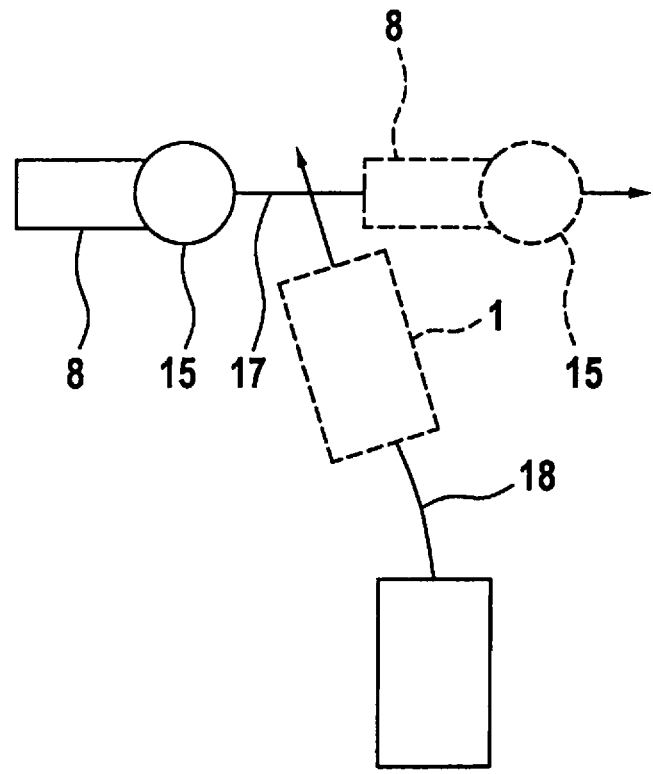
FIG. 3 shows a schematic representation of the situation from FIG. 2 with the evasive maneuver according to the described method.

FIG. 3 shows another example, which differs from the one from FIG. 2 in that an evasion maneuver is performed in this case. For this purpose, an evasion trajectory 18 is indicated in place of the expected trajectory 16 of motor vehicle 1. The indicated evasion trajectory 18 is the one that was selected from a plurality of evasion trajectories and along which the least damage is to be expected. In this example, there exists no evasion trajectory along which a collision could be prevented entirely.

Motor vehicle 1 and animal 8, which is the collision object in this case, overlap only a little in the collision so that a preferably small portion of motor vehicle 1 will be affected by the collision. In this example, the evasive maneuver of motor vehicle 1 occurs on the left side and thus counter to a moving direction of animal 8 and of head 15. As a result, particularly the rear area 21 of animal 8 will be affected by the collision. This in particular takes into account that an animal tends to speed up rather than slow down when it detects a danger. The chosen evasion trajectory 18 also protects driver 3 sitting on the left side of motor vehicle 1 in the best way possible.

Figure 4:
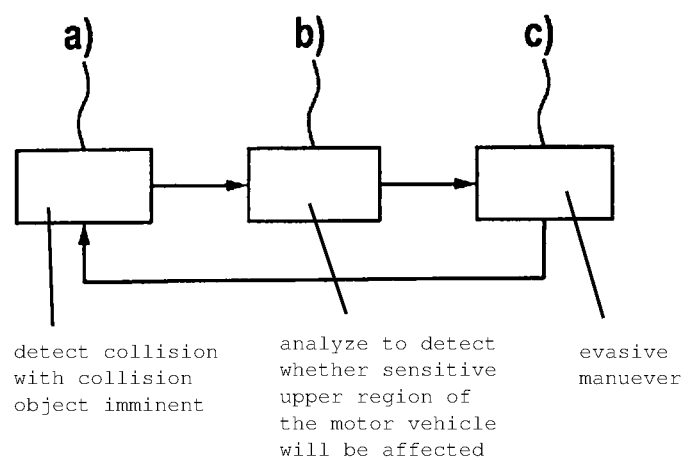
FIG. 4 shows a flow chart of the described method.

FIG. 4 shows a flow chart of the described method. The figure shows method steps a) through c), which are performed preferably continuously (possibly in the manner of a loop) during the entire operation of the motor vehicle. The initiation of an evasive maneuver according to step c) is performed only if a collision of the motor vehicle with the at least one collision object is imminent.

What is claimed is:

1. A method for performing an evasive maneuver of a motor vehicle in the event of an imminent collision with at least one collision object, the method comprising:
   a) detecting that a collision with the at least one collision object is imminent;
   b) analyzing the at least one collision object and detecting whether a particularly sensitive upper region of the motor vehicle would be at least partially affected by the collision, the analyzing including ascertaining a height of a center of mass of the at least one collision object; and
   c) outputting a signal for initiating an evasive maneuver when a collision of the motor vehicle with the at least one collision object is imminent by which the particularly sensitive upper region of the motor vehicle would be at least partially affected;
   wherein the evasive maneuver of step c) is initiated when the ascertained height of the center of mass of the at least one collision object is higher than a predetermined minimum height.

2. The method as recited in claim 1, wherein in step a), the surroundings of the motor vehicle are monitored for possible collision objects at least with assistance of a surround sensor of the motor vehicle.

3. The method as recited in claim 1, wherein the evasive maneuver of step c) is performed in such a way that a small portion of the motor vehicle will be affected by a collision.

4. The method as recited in claim 1, wherein the evasive maneuver of step c) is performed in such a way that a driver of the motor vehicle is protected in the best way possible.

5. The method as recited in claim 1, wherein prior to step c), a check is performed to determine which seats of the motor vehicle are occupied, and wherein the evasive maneuver according to step c) is adapted as a function of the seat occupancy.

6. The method as recited in claim 1, wherein prior to step c), sitting positions of occupants of the motor vehicle are analyzed, and wherein the evasive maneuver in step c) is adapted as a function of the sitting position of the occupants.

7. The method as recited in claim 1, wherein prior to step c), a movement of the collision object is evaluated, and wherein the evasive maneuver of step c) is performed in such a way that only a rear area, relative to the moving direction of the collision object, will be affected by the collision.

8. The method as recited in claim 1, wherein in step b), an analysis is performed to determine whether the collision object has a shape of an animal.

9. The method as recited in claim 8, wherein the evasive maneuver of step c) is performed at least in the case in which the animal analyzed in step b) exceeds a minimum size.

10. The method as recited in claim 8, wherein following step c), at least one of light signals and sound signals are emitted in order to scare the collision object recognized as an animal.

11. A control unit for a motor vehicle, the control unit designed to perform an evasive maneuver of a motor vehicle in the event of an imminent collision with at least one collision object, the control unit configured to:
   a) detect that a collision with the at least one collision object is imminent;
   b) analyze the at least one collision object and detecting whether a particularly sensitive upper region of the motor vehicle would be at least partially affected by the collision, the analyzing including ascertaining a height of a center of mass of the at least one collision object; and
   c) output a signal for initiating an evasive maneuver if a collision of the motor vehicle with the at least one collision object is imminent by which the particularly sensitive upper region of the motor vehicle would be at least partially affected;
   wherein the evasive maneuver of c) is initiated when the ascertained height of the center of mass of the at least one collision object is higher than a predetermined minimum height.

12. A non-transitory machine-readable storage medium on which is stored a computer program for performing an evasive maneuver of a motor vehicle in the event of an imminent collision with at least one collision object, the computer program, when executed by a processor, causing the processor to perform:

a) detecting that a collision with the at least one collision object is imminent;

b) analyzing the at least one collision object and detecting whether a particularly sensitive upper region of the motor vehicle would be at least partially affected by the collision, the analyzing including ascertaining a height of a center of mass of the at least one collision object; and c) outputting a signal for initiating an evasive maneuver if a collision of the motor vehicle with the at least one collision object is imminent by which the particularly sensitive upper region of the motor vehicle would be at least partially affected;

wherein the evasive maneuver of step c) is initiated when the ascertained height of the center of mass of the at least one collision object is higher than a predetermined minimum height.

13. The method as recited in claim 1, wherein the predetermined minimum height is a height of an engine hood of the motor vehicle.

14. The control unit as recited in claim 11, wherein the predetermined minimum height is a height of an engine hood of the motor vehicle.

15. The non-transitory machine-readable storage medium as recited in claim 12, wherein the predetermined minimum height is a height of an engine hood of the motor vehicle.

* * * * *